United States Patent
Chen et al.

(10) Patent No.: US 7,167,422 B2
(45) Date of Patent: Jan. 23, 2007

(54) OPTICAL RECORDING APPARATUS CAPABLE OF OPTIMIZING WRITE DEFOCUS AND METHOD THEREOF

(75) Inventors: Chi-Hung Chen, Tao-Yuan Hsien (TW); William Wai Wang, Tao-Yuan (TW); Jung-Chih Tsai, Kao-Hsiung Hsien (TW); Hung-Chu Chu, Taipei Hsien (TW); Fang-Wei Chang, Taipei Hsien (TW); Tony P. Van Endert, Eindhoven (NL); Arie Van Boxtel, Eindhoven (NL)

(73) Assignee: BenQ Corporation, Tao-Yuan Hsien (TW)

( * ) Notice: Subject to any disclaimer, the term of this patent is extended or adjusted under 35 U.S.C. 154(b) by 344 days.

(21) Appl. No.: 10/711,545

(22) Filed: Sep. 24, 2004

(65) Prior Publication Data

US 2006/0072416 A1    Apr. 6, 2006

(51) Int. Cl.
   *G11G 7/00* (2006.01)
(52) U.S. Cl. .................. 369/44.29; 369/44.35
(58) Field of Classification Search ............ 369/44.29, 369/44.35, 94, 47.53, 44.23, 44.25, 53.2, 369/53.35
   See application file for complete search history.

(56) References Cited

U.S. PATENT DOCUMENTS 4,707,648 A * 11/1987 Minami .................. 369/44.35
5,251,194 A * 10/1993 Yoshimoto et al. ...... 369/44.26
5,574,706 A    11/1996 Verboom et al.
5,798,988 A *  8/1998 Koyama ...................... 369/94
5,978,328 A * 11/1999 Tanaka ................... 369/44.27
6,687,194 B1 *  2/2004 Kobayashi et al. ........ 369/53.2
6,731,573 B1 *  5/2004 Takeda .................... 369/44.29
6,839,310 B1 *  1/2005 Yoshida ................... 369/53.11

* cited by examiner

*Primary Examiner*—Thang V. Tran
(74) *Attorney, Agent, or Firm*—Winston Hsu

(57) ABSTRACT

An optical recording apparatus includes an optical pickup unit for generating and directing optical signals onto a given optical medium, and for detecting corresponding reflected optical signals from the optical medium; a focus motor for moving a focusing lens on the optical pickup according to a focus signal for adjusting a defocus of the optical signals on the optical medium; and a focus controller for generating the focus signal. During write operations of the optical recording apparatus, the focus controller is for performing write defocus calibration on the given optical medium to determine an optimal write defocus value for the optical medium. If the optical medium has multiple layers, the write defocus calibration is performed on a particular layer of the optical disc toward which write operations are directed. If the optimal defocus write value is different than a starting write defocus value, an updated write defocus value is stored.

24 Claims, 4 Drawing Sheets

OPTICAL RECORDING APPARATUS CAPABLE OF OPTIMIZING WRITE DEFOCUS AND METHOD THEREOF

BACKGROUND OF INVENTION

1. Field of the Invention

The invention relates to optical data storage systems, and more particularly, to an optical recording apparatus capable of adjusting a write defocus value of optical signals used to write data on an optical medium.

2. Description of the Prior Art

In the field of optical data storage systems, it is necessary to read data from and write data to an optical medium utilizing an optical recording apparatus. The optical recording apparatus detects variations or marks on the optical medium (e.g. an optical disc). These marks are written to the optical medium in a meaningful manner and make up the stored data. Therefore, accurate creation and detection of these marks on the optical medium is essential in order to reliably store and reproduce data.

The optical recording apparatus typically includes various lenses and positioning devices which cooperate with one another to provide focusing on the optical media. The optical characteristics of this system will often change over time and thus cause variations in the system operation. These changes can result from a large number of things such as changes in temperature causing related changes in optical properties, all of which dramatically affect the operation of the system. Further, the optical elements are typically mechanically positioned and aligned. This alignment and positioning can vary as the optical recording apparatus itself encounters shock and vibration. All of these misalignments affect the focusing of the read/write system, and ultimately affect the performance of the disk drive.

Typically, read out systems include mechanisms which allow some offset to be injected into the focusing control. Often, focusing is controlled by a servo which will drive a focus motor and appropriately position the focusing lens. As is well known, an offset can easily be introduced into this servo system in order to vary the focus operations. This focusing offset is often referred to as a defocus value. Due to the circumstances outlined above, it is necessary to periodically check the focusing operation and insure that optimum focusing parameters such as the defocus value are being used.

In addition to variations in the alignment of the focusing system, the actual storage media may not be consistent. Substrate thicknesses in the optical media often change from disc to disc. Therefore, the read defocus is typically optimized every time an optical medium such as an optical disc is changed.

Various methodologies have been used to optimize the read defocus value, and much development has been performed to develop a system and process for efficiently optimizing the read defocus of an optical storage system. For example, U.S. Pat. No. 5,574,706 entitled "Focus Offset Optimization For Reading Optically-Recorded Data" describes one such methodology wherein both control marks and reference data marks are recorded in each frame when the disk is initially written. The recorded reference data marks are placed no farther apart than the smallest distance between two successive data marks which must be resolved as a blank space or zero during the read out process. Analyzing the signals produced when reading out these signals, and insuring that the distance between marks can be resolved allows for optimum read focus. Other systems have used isolated data sectors which are continually read at different read focus offset levels.

During write operations of an optical recording apparatus, the defocus of optical signals used to write data to the optical medium must also be set to a particular value. In the related art, this write defocus value is simply set equal to the optimum read defocus value. However, the read defocus value may not be optimal for write operations having higher laser powers and different characteristics. Therefore, degradation in the accuracy of the stored data may occur when writing data to an optical medium while using the optimal read defocus value.

SUMMARY OF INVENTION

One objective of the claimed invention is therefore to provide an optical recording apparatus capable of performing write defocus calibration during write operations to determine an optimal write defocus value and thereby increase the accuracy of data stored to an optical medium.

According to an exemplary embodiment of the claimed invention, an optical recording apparatus is disclosed comprising an optical pickup unit for generating and directing optical signals onto an optical medium, and for detecting corresponding reflected optical signals from the optical medium; a focus motor for moving a focusing lens on the optical pickup according to a focus signal to thereby adjust a defocus value of the optical signals on the optical medium; and a focus controller for generating the focus signal; wherein during write operations of the optical recording apparatus, the focus controller is for performing write defocus calibration on the optical medium to determine an optimal write defocus value for the optical medium.

According to another exemplary embodiment of the claimed invention, a method is disclosed for focusing optical signals onto an optical medium in an optical recording apparatus. The method comprises providing an optical pickup unit for generating and directing the optical signals onto the optical medium, and for detecting corresponding reflected optical signals from the optical medium; adjusting a defocus value of the optical signals on the optical medium by moving a focusing lens on the optical pickup; and during write operations of the optical recording apparatus, performing write defocus calibration on the optical medium to determine an optimal write defocus value for the optical medium.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
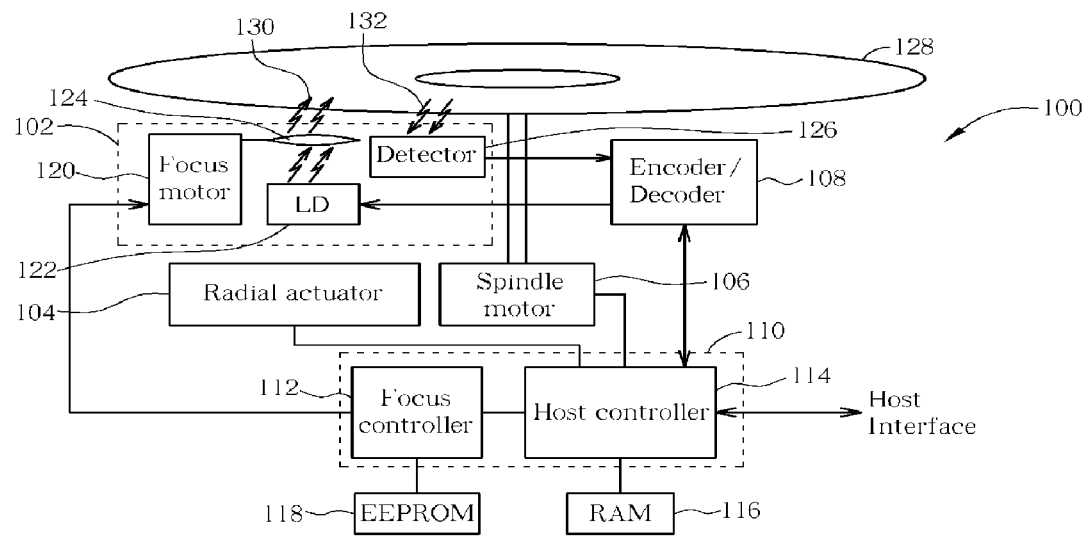
FIG. 1 is a block diagram of an optical recording apparatus according to an exemplary embodiment of the present invention.

FIG. 1 is a block diagram of an optical recording apparatus 100 according to an exemplary embodiment of the present invention. The optical recording apparatus 100 includes an optical pickup unit 102, a radial actuator 104, a spindle motor 106, an encoder/decoder 108, and a control unit 110. In this embodiment, the control unit 110 includes a focus controller 112 and a host controller 114. A random access memory (RAM) 116 is connected to the host controller 114, and a non-volatile memory such as an electrically erasable programmable read only memory (EEPROM) 118 is connected to the focus controller 112. Additionally, the pickup unit 102 includes a focus motor 120, a laser diode 122, a focusing lens 124, and an optical detector 126.

During both read and write operations, an optical medium 128 such as an optical disc is rotated appropriately by the spindle motor 106, and the optical pickup unit 102 is positioned at a desired radial distance from the center of the optical medium 128 by the radial actuator 104. The focus motor 102 on the optical pickup moves the focusing lens 124 to thereby adjust a defocus value of optical signals 130 onto the optical medium 128. The detector 126 detects the reflected optical signals 132 corresponding to the light reflected from the optical medium 128. The encoder/decoder 108 is capable of producing either encoded information for write operations or decoded data for read operations.

During write operations of the optical recording apparatus 100, the focus controller 112 performs a write defocus calibration on the optical medium 128 to determine an optimal write defocus value. In a preferred embodiment, the write defocus calibration is performed at the beginning of the first write operation to each given optical medium 128. In this way, the write defocus calibration results in the optimal write defocus value being specific for the given optical medium being used to store data, and all data that is thereafter stored on the optical medium is stored using the optimal write defocus value. Additionally, the EEPROM 118 is used for storing a plurality of mappings relating different types of optical media to different write defocus values. These write defocus values for different media types stored in the EEPROM 118 allow the starting point of the write defocus calibration to be set close to what an expected resulting optimal write defocus value will be. If the resulting optimal write defocus value for a particular type of optical medium is different than the value stored in the EEPROM 118, the EEPROM can be updated to give a better starting write defocus value for the particular type of optical medium.

Figure 2:
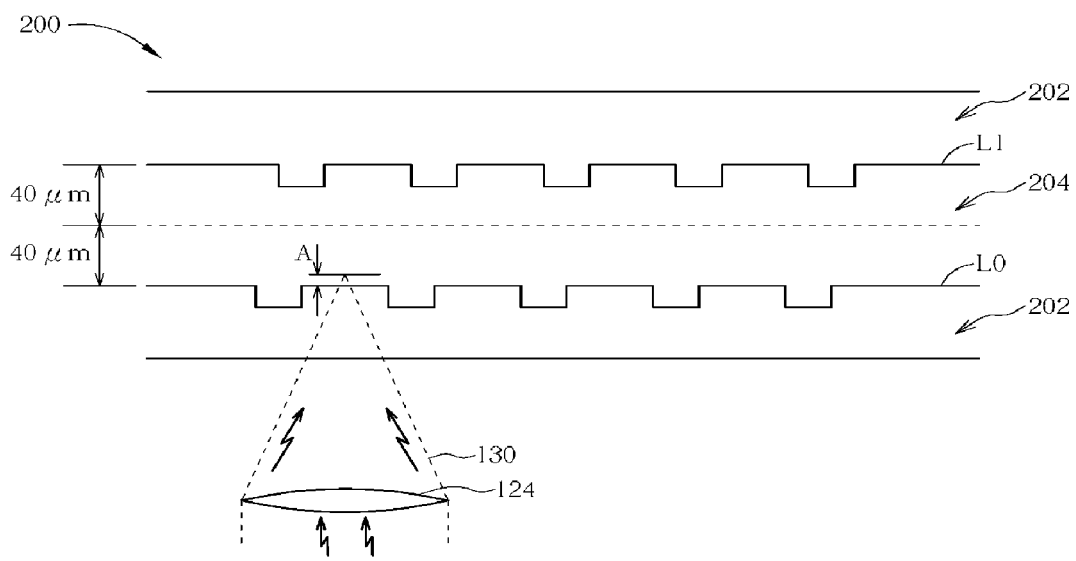
FIG. 2 is a cross sectional diagram of write defocus calibration being performed on a two-layer optical disc according to an exemplary embodiment of the present invention.

Because, for a two-layered optical disc, the optimal write defocus value is often different than the optimal read defocus value, it should be noted that the present invention is particularly well suited to multi-layered optical media. For example, FIG. 2 shows a cross sectional diagram of write defocus calibration being performed on a two-layer optical disc 200 according to an exemplary embodiment of the present invention. The two-layered optical disc 200 includes two sections of substrate 202 and two layers L1, L0 separated by a spacer 204. Each layer L1, L0 shown in FIG. 2 may have different optimal write defocus values. More specifically, as shown in FIG. 2, the center of layer two L0 (at zero defocus) is a distance of 40 micrometers from the center of the optical disc 200. However, after write defocus calibration, the focusing lens 124 is positioned such that the optical signals 130 emitted by the laser diode 122 are focused with a write defocus value A. In this example, the write defocus value A is the optimal write defocus value for layer two L0. Subsequent write operations on layer two L0 of this optical disc 200 will be performed using the optimal write defocus value A. If write operations are to be performed on layer one L1, in this preferred embodiment of the present invention, another write defocus calibration is performed on layer one L1 to determine an optimal write defocus value specific for layer one L1 of this particular optical disc 200. As stated, the optimal write defocus value for layer one L1 will not necessarily be the same as the optimal write defocus value A for layer two L0. Subsequent write operations on layer one L1 will then be performed using the optimal write defocus value specific for layer one L1.

Figure 3:
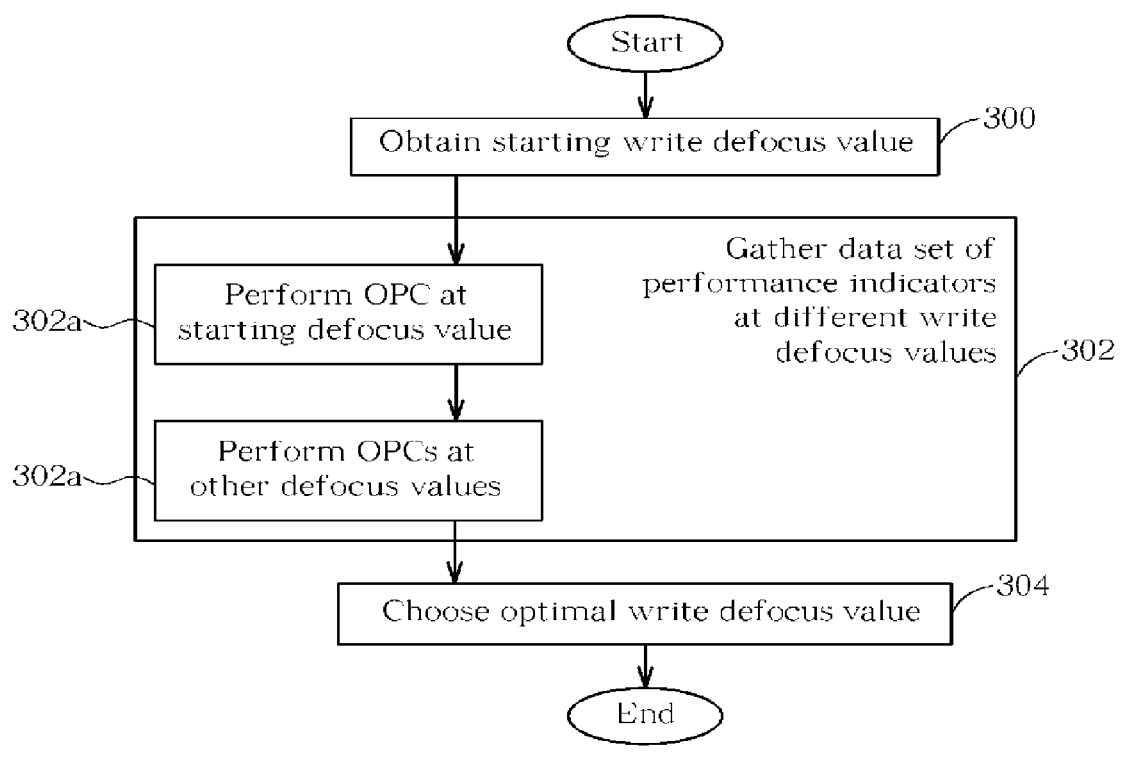
FIG. 3 is a flowchart describing a write defocus calibration performed by the optical recording apparatus of FIG. 1 according to an exemplary embodiment of the present invention.

FIG. 3 is a flowchart describing a write defocus calibration performed by the optical recording apparatus 100 of FIG. 1 according to an exemplary embodiment of the present invention. In this embodiment, the write defocus calibration flowchart of FIG. 3 includes the following steps:

Step 300: Obtain a starting write defocus value for the optical medium 128. For example, the starting write defocus value could be a write defocus value stored in the EEPROM 118 corresponding to the type of the optical medium 128. Alternatively, if the optical recording apparatus 100 does not include a write defocus value stored therein corresponding to the type of the optical medium 128, the starting write defocus value could be an optimal read defocus value corresponding to the type of the optical medium 128 (being determined using methods of the related art or stored in the EEPROM 118). In another embodiment, the starting write defocus value could be a default defocus value.

Step 302: Gather a data set relating write power of the optical signals to performance indicators at each of a plurality of different defocus values. As shown in the embodiment illustrated in FIG. 3, step 302 involves performing a plurality of optimal power calibrations (OPC) at each of a plurality different defocus values, wherein one of the different defocus values is the starting write defocus value. More specifically, in Step 302a, perform an OPC at the starting defocus value, and then at step 302b, perform an OPC at a plurality of other defocus values. As will be understood by a person of ordinary skill in the art of optical drives, a fundamental operation of optical drives is the OPC process in which the optimal recording power for a given optical medium is determined. In the OPC process, a series of recording tests are performed to a power calibration area of the optical disc. The present invention uses the data returned by the OPC process to measure various performance criteria of each test. The write operations of different OPC tests are performed using different write defocus values. It should be noted, that during the OPC tests, the optimal read defocus value (either stored in the EEPROM for the type of the given optical medium or determined using another process) is used to read information from the optical medium. For example, information read from the optical medium using the optimal read defocus value could be used to determine performance indicators such as jitter and a block error rate such as parity inner (PI) of the reflected optical signals from the optical medium. In this way, the data set relating write power of the optical signals to performance indicators at each of a plurality of different defocus values is obtained.

Step 304: Choose the optimal write defocus value according to the data set obtained in step 302. The optical write defocus value is the defocus value of the data set having the optimal combined performance criteria.

Figure 4:
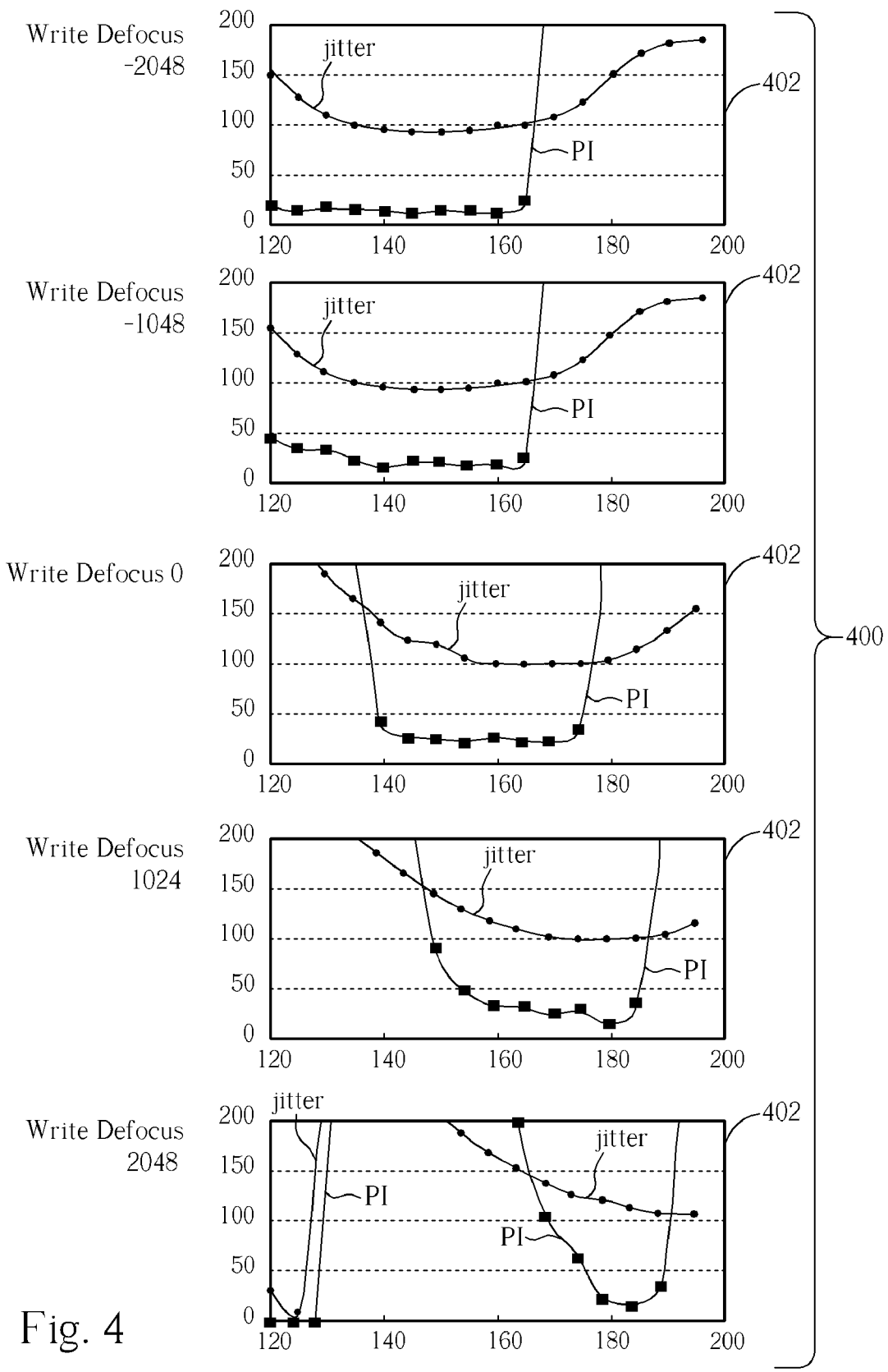
FIG. 4 is a diagram showing the data set created during the write defocus calibration of FIG. 3 according to an exemplary embodiment of the present invention.

For a more detailed description of Step 302, refer to FIG. 4 showing an example diagram illustrating the data set 400 created during the write defocus calibration of FIG. 3 according to an exemplary embodiment of the present invention. In FIG. 4, the data set 400 includes performance indicators (jitter and PI) from five different OPC tests 402. Each of the OPC tests 402 is performed using a different write defocus value (e.g., −2048, −1024, 0, 1024, 2048). It should be noted that the number of OPC tests performed and the difference of defocus values between OPS tests is used in this example for simplicity of illustration; however, in an actual implementation, greater than five OPC tests could also be performed with the difference between the write defocus value of each OPC test being smaller than 1024. Additionally, in this example, it is assumed that the optimal write defocus value obtained in Step 300 is a value of 0, and therefore, the data set 400 includes the performance indicators obtained from an OPC test 402 being performed with a write defocus value of 0. Please note, to ensure an accurate result, in another embodiment, all available defocus values could also have an OPC test performed. Due to improper or extreme write defocus values, some of the OPC tests may "fail" due to extremely poor data quality. However, in these cases, the returned performance indicators can still be included in the data set 400. Furthermore, during initial calibration at the manufacturer, because the optical disc used for calibration does not need store user data, the plurality of OPC tests 402 can be performed in any area of the optical disc and are not limited to being performed in the power calibration area of the optical disc. In this situation, in order to provide conditions representative of typical user write operations, the OPC tests could be performed in the outer diameter of an optical test-disc.

At Step 304, the data set 400 is analyzed to determine which write defocus value has the optimal combined performance criteria. In the example shown in FIG. 4, the optimal combined performance criteria refers to the combined result of both jitter and PI. More specifically, the focus controller 112 locates a set of contiguous defocus values in the data set 400 that have valid data. In the example shown in FIG. 4, as will be explained, except the OPC test 402 having a write defocus value of 2048, all the OPC tests 402 have valid and data. Next, a width value for each of the performance indicators is measured. Using the values of the performance indicators in FIG. 4 as an example, the width of acceptable jitter margin can be calculated for all the jitter values being greater than a first threshold of 70 and less than a second threshold of 150. Because it is known in this example that jitter values lower than 70 are not possible in actual implementations and are therefore invalid, the first threshold of 70 is used to ensure that the jitter values (and therefore the data returned by the OPC test) are valid. Because the data of the OPC test at write defocus value of 2048 includes jitter values below 70, the OPC test at write defocus value of 2048 is determined to be invalid. The second threshold of 150 is used because jitter values above 150 are not too severe and will degrade the performance of the optical recording apparatus 100. For the PI curve, in the example of FIG. 4, the margin width is the width of all the PI values being less than a third threshold of 25. This ensures the PI block error rate is sufficiently low. In this embodiment, the combination of the jitter values between the first and second threshold and the PI values lower than the third threshold form the optimal combined performance criteria. It should be noted that the width of these margins should also be normalized with respect to the average write power of the optical signals. More specifically, using the margins just described, the width value is calculated using the following formula:

$$\text{Width value} = (\text{Power step}) * (\text{\# of points}) / (\text{Average power}) \qquad \text{Formula 1}$$

Finally, for all the OPC tests 402 having a width value greater than a fourth threshold (e.g. fourth threshold=5%=0.05), the defocus value having either the widest or second widest width value is chosen as the optimal write defocus value. In this embodiment, the decision between the defocus value for the widest or the second widest width value is made by examining the jitter values. More specifically, the defocus value with the widest or second widest width having the lowest jitter value is chosen as the optimal write defocus value.

As will be recognized by a person of ordinary skill in the art after reading the above description, the actual implementation of step 304 described above is only one possible embodiment of the present invention. The actual definition of the optimal combined performance criteria can be modified by a system designer. That is, the above description of step 304 is meant as an illustration of one exemplary embodiment of the present invention and is not meant as a limitation. For example, different values of the first to fourth thresholds could be used, different method other than OPC test could be used to gather the data set 400, and different signals other than jitter and PI could be examined as the performance indicators.

Figure 5:
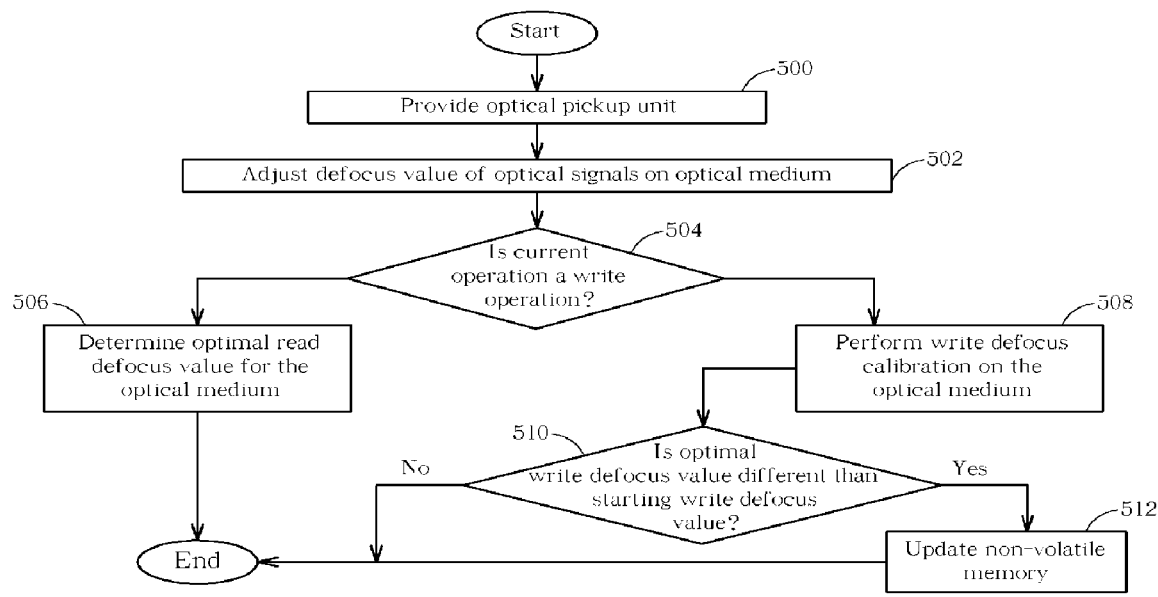
FIG. 5 is a flowchart describing a method of focusing optical signals onto an optical medium in an optical recording apparatus according to an exemplary embodiment of the present invention.

FIG. 5 is a flowchart describing an overall method of focusing optical signals onto an optical medium 128 in an optical recording apparatus 100 according to an exemplary embodiment of the present invention. The flowchart shown in FIG. 5 includes the following steps:

Step 500: Provide an optical pickup unit 102 for generating and directing optical signals 130 onto a given optical medium 128, and for detecting corresponding reflected optical signals 132 reflected from the optical medium 128.

Step 502: Adjust a defocus value A of the optical signals on the optical medium 128 by moving a focusing lens 124 on the optical pickup 102.

Step 504: Is the current operation a write operation to write data to the optical medium 128? For example, is this the first write operation to a given optical medium 128, or the first write operation to a particular layer of the optical medium 128? If yes, proceed to step 508; otherwise, proceed to step 506.

Step 506: During read operations of the optical recording apparatus, determine an optimal read defocus value for the optical medium. For example, a read defocus method of the related art can be used, or a read defocus value could be read from the EEPROM 118.

Step 508: During write operations of the optical recording apparatus 100, perform write defocus calibration on the optical medium starting from a starting write defocus value to determine an optimal write defocus value for the optical medium 128. That is, adjust the defocus value A of the optical signals of the optical medium 128 to determine the optimal write defocus value. As stated above, if the optical medium 128 is an optical disc having multiple layers, step 504 is performed according to the particular layer toward which write operations are directed. That is, adjust the defocus value A of the optical signals on the particular layer of the optical medium 128 to determine the optimal write defocus value. More specifically, the write defocus calibration of step 504 can be performed according to the steps illustrated in FIG. 3. In a preferred embodiment, the write calibration operation is performed at the beginning of write operations to a particular layer, and then the focus motor 102 is used to set the defocus value A to the optimal write defocus value for the duration of the write operations to the particular layer.

Step 510: Is the optimal write defocus value different than the starting write defocus value? If yes, proceed to step 512.

Step 512: If the optimal write defocus value resulting from step 504 is different than the starting write defocus value used in step 504, update the EEPROM 118 with an updated write defocus value for the type of the optical medium 128. The update is performed by storing an updated write defocus value for the type of the given optical medium 128 in the EEPROM 118. In order to prevent an abnormal optical medium 128 having a different optimal write defocus value from excessively changing the starting write defocus value stored in the EEPROM 118, the updated write defocus value for the type of the optical medium can be a value between the write defocus value stored in the EEPROM 118 and the optimal write defocus value. For example, a value halfway between the optimal write defocus value and the write defocus value stored in the EEPROM 118, or a weighted average between the two could be used as the updated write defocus value.

The present invention provides an optical recording apparatus and method capable of performing write defocus calibration during write operations to determine an optimal write defocus value and thereby increase the accuracy of data stored to an optical medium. The optical recording apparatus includes an optical pickup unit for generating and directing optical signals onto a given optical medium, and for detecting corresponding reflected optical signals from the optical medium; a focus motor for moving a focusing lens on the optical pickup according to a focus signal for adjusting a defocus of the optical signals on the optical medium; and a focus controller for generating the focus signal. During write operations of the optical recording apparatus, the focus controller is for performing write defocus calibration on the given optical medium starting from a starting write defocus value to determine an optimal write defocus value for the optical medium. If the optical medium has multiple layers, the write defocus calibration is performed on a particular layer of the optical disc toward which write operations are directed. Finally, if the optimal defocus write value is different than the starting write defocus value, an updated write defocus value corresponding to the type of the given optical medium is stored in a non-volatile memory of the optical recording apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical recording apparatus comprising:
   an optical pickup unit for generating and directing optical signals onto an optical medium, and for detecting corresponding reflected optical signals from the optical medium;
   a focus motor for moving a focusing lens on the optical pickup according to a focus signal to thereby adjust a defocus value of the optical signals on the optical medium; and
   a focus controller for generating the focus signal;
   wherein during write operations of the optical recording apparatus, the focus controller is for performing write defocus calibration on the optical medium to determine an optimal write defocus value for the optical medium.

2. The optical recording apparatus of claim 1, wherein during read operations of the optical recording apparatus, the focus controller is further for determining an optimal read defocus value for the optical medium.

3. The optical recording apparatus of claim 1, wherein the optical medium is an optical disc having multiple layers; and during write operations of the optical recording apparatus on a particular layer of the optical disc, the focus controller is for performing write defocus calibration on the particular layer of the optical disc to determine the optimal write defocus value for the particular layer of the optical disc.

4. The optical recording apparatus of claim 1, further comprising a non-volatile storage unit for storing a plurality of mappings relating different types of optical media to different write defocus values.

5. The optical recording apparatus of claim 4, wherein during write operations of the optical recording apparatus, the focus controller is for performing the write defocus calibration starting from a starting write defocus value being a write defocus value stored in the non-volatile storage unit corresponding to the type of the optical medium.

6. The optical recording apparatus of claim 5, wherein if the non-volatile storage unit does not include a write defocus value stored therein corresponding to the type of the optical medium, the focus controller is for performing the write defocus calibration starting from an optimal read defocus value corresponding to the type of the optical medium or starting from a default defocus value.

7. The optical recording apparatus of claim 5, wherein during write defocus calibration on the optical medium, the focus controller is for performing a plurality of optimal power calibrations at different defocus values to gather a data set relating write power of the optical signals to performance indicators at each of the different defocus values, wherein one of the different defocus values is the starting write defocus value.

8. The optical recording apparatus of claim 7, wherein the optical medium is an optical disc, and the optimal power calibrations are performed on any area of the optical disc.

9. The optical recording apparatus of claim 7, wherein the performance indicators include jitter or a block error rate of the reflected optical signals from the optical medium.

10. The optical recording apparatus of claim 7, wherein during write defocus calibration on the optical medium, the focus controller is for choosing the optimal write defocus value according to the data set, the optical write defocus value being a particular defocus value of the different defocus values of the data set having an optimal combined performance criteria.

11. The optical recording apparatus of claim 5, wherein if the optimal write defocus value resulting from the write defocus calibration is different than the starting write defocus value, the focus controller is further for updating the non-volatile storage unit with an updated write defocus value for the type of the optical medium.

12. The optical recording apparatus of claim 11, wherein the updated write defocus value for the type of the optical medium is a value between the starting write defocus value and the optimal write defocus value.

13. A method of focusing optical signals onto an optical medium in an optical recording apparatus, the method comprising:

providing an optical pickup unit for generating and directing the optical signals onto the optical medium, and for detecting corresponding reflected optical signals from the optical medium;

adjusting a defocus value of the optical signals on the optical medium by moving a focusing lens on the optical pickup; and during write operations of the optical recording apparatus, performing write defocus calibration on the optical medium to determine an optimal write defocus value for the optical medium.

14. The method of claim 13, further comprising determining an optimal read defocus value for the optical medium during read operations of the optical recording apparatus.

15. The method of claim 13, wherein the optical medium is an optical disc having multiple layers; and the method further comprises during write operations of the optical recording apparatus on a particular layer of the optical disc, performing write defocus calibration on the particular layer of the optical disc to determine the optimal write defocus value for the particular layer of the optical disc.

16. The method of claim 13, further comprising storing a plurality of mappings relating different types of optical media to different write defocus values in the optical recording apparatus.

17. The method of claim 16, further comprising during write operations of the optical recording apparatus, performing the write defocus calibration starting from a starting write defocus value being a write defocus value stored in the optical recording apparatus corresponding to the type of the optical medium.

18. The method of claim 17, further comprising if the optical recording apparatus does not include a write defocus value stored therein corresponding to the type of the optical medium, performing the write defocus calibration starting from an optimal read defocus value corresponding to the type of the optical medium or starting from a default defocus value.

19. The method of claim 17, further comprising during write defocus calibration on the optical medium, gathering a data set relating write power of the optical signals to performance indicators at each of a plurality of different defocus values by performing a plurality of optimal power calibrations at each of the different defocus values, wherein one of the different defocus values is the starting write defocus value.

20. The method of claim 19, wherein the optical medium is an optical disc, and the method further comprises performing the optimal power calibrations in any area of the optical disc.

21. The method of claim 19, wherein the performance indicators include jitter or a block error rate of the reflected optical signals from the optical medium.

22. The method of claim 19, further comprising during write defocus calibration on the optical medium, choosing the optimal write defocus value according to the data set, the optical write defocus value being a particular defocus value of the different defocus values of the data set having an optimal combined performance criteria.

23. The method of claim 17, further comprising if the optimal write defocus value resulting from the write defocus calibration is different than the starting write defocus value, updating the optical storage apparatus by storing an updated write defocus value for the type of the optical medium in the optical storage apparatus.

24. The method of claim 23, wherein the updated write defocus value for the type of the optical medium is a value between the starting write defocus value and the optimal write defocus value.

* * * * *